(12) United States Patent
Scholl (10) Patent No.: US 8,570,857 B2
(45) Date of Patent: Oct. 29, 2013

(54) RESILIENT IP RING PROTOCOL AND ARCHITECTURE

(75) Inventor: Thomas Bradley Scholl, New Haven, CT (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 983 days.

(21) Appl. No.: 11/278,980

(22) Filed: Apr. 7, 2006

(65) Prior Publication Data

US 2007/0237072 A1  Oct. 11, 2007

(51) Int. Cl.
| | | |
|---|---|---|
| *G01R 31/08* | (2006.01) | |
| *G01R 31/28* | (2006.01) | |
| *H04J 1/16* | (2006.01) | |
| *H04L 12/26* | (2006.01) | |
| *H04L 12/28* | (2006.01) | |
| *G06F 11/00* | (2006.01) | |

(52) U.S. Cl.
USPC ............. 370/218; 370/22; 370/244; 370/406; 714/4.2; 714/717

(58) Field of Classification Search
USPC ......... 370/216–228, 258, 351–353, 404–406, 370/244; 398/1–5, 42–49, 59, 79, 83; 709/220–227; 714/4.2, 717
See application file for complete search history.

(56) References Cited

U.S. PATENT DOCUMENTS

| | | | |
|---|---|---|---|
| 6,259,837 B1 * | 7/2001 | de Boer et al. ................. 385/24 |
| 6,532,088 B1 * | 3/2003 | Dantu et al. .................... 398/43 |
| 6,647,428 B1 | 11/2003 | Bannai et al. | |
| 6,717,922 B2 * | 4/2004 | Hsu et al. ...................... 370/258 |
| 6,721,269 B2 * | 4/2004 | Cao et al. ...................... 370/227 |
| 6,760,302 B1 * | 7/2004 | Ellinas et al. ................. 370/228 |
| 6,785,285 B1 | 8/2004 | Romana et al. | |
| 6,952,397 B2 * | 10/2005 | Mor et al. ...................... 370/223 |
| 6,963,575 B1 * | 11/2005 | Sistanizadeh et al. ........ 370/404 |
| 6,993,039 B2 * | 1/2006 | Borella ......................... 370/401 |
| 7,167,443 B1 * | 1/2007 | Dantu et al. .................. 370/218 |
| 7,283,478 B2 * | 10/2007 | Barsheshet et al. ........... 370/238 |
| 7,457,233 B1 * | 11/2008 | Gan et al. ...................... 370/216 |
| 7,570,637 B2 * | 8/2009 | Serbest et al. ................ 370/389 |
| 7,623,446 B1 * | 11/2009 | Allan et al. .................... 370/223 |
| 2002/0031085 A1 * | 3/2002 | Maeno ........................... 370/216 |
| 2003/0117946 A1 * | 6/2003 | Fontana et al. ............... 370/216 |
| 2003/0165119 A1 * | 9/2003 | Hsu et al. ...................... 370/258 |
| 2004/0114922 A1 * | 6/2004 | Hardee .......................... 398/17 |

(Continued)

OTHER PUBLICATIONS

IEEE 802.17 Standard, part 17: Resilient packet ring (RPR) access method and physical layer specifications, Sep. 2004, pp. i, 2, 50, 288-291.*

*Primary Examiner* — Xavier S Wong
*Assistant Examiner* — Jeremy Costin
(74) *Attorney, Agent, or Firm* — Guntin & Gust, PLC; Douglas Schnabel (57) ABSTRACT

A system and method are disclosed for a resilient IP ring protocol. A system that incorporates teachings of the present disclosure may include, for example, a communication device using a resilient internet protocol (IP) ring protocol, including a controller (602) that manages operations of a transceiver (620) for exchanging messages in a communication system with adjacent ring nodes in a communication ring architecture (300). The controller can be programmed to use sub-second level signaling between adjacent ring nodes to determine when adjacent ring nodes have failed and enable failure options upon detection of an adjacent ring-node failure. Additional embodiments are disclosed.

14 Claims, 5 Drawing Sheets

300

(56) References Cited

U.S. PATENT DOCUMENTS

| | | |
|---|---|---|
| 2005/0026638 A1 | 2/2005 | Romana et al. |
| 2005/0063396 A1 | 3/2005 | Yu |
| 2005/0094577 A1* | 5/2005 | Ashwood-Smith ........... 370/257 |
| 2005/0276217 A1* | 12/2005 | Gadgil et al. ................. 370/225 |
| 2006/0092916 A1* | 5/2006 | Harmon et al. ................ 370/352 |
| 2007/0268913 A1* | 11/2007 | Denecheau et al. .......... 370/397 |

* cited by examiner

RESILIENT IP RING PROTOCOL AND ARCHITECTURE

FIELD OF THE DISCLOSURE

The present disclosure relates generally to communication systems, and more specifically to ring protocols and architectures used in communication systems.

BACKGROUND

Synchronous Optical Network (SONET) is a standard for multiplexing data. It is used primarily for backbones composed of fiber optics. SONET performs a complicated timing and multiplexing scheme. It uses certain signaling levels called "Synchronous Transport Signals" or STS. Each STS level corresponds to a specification of "Optical Carriers." Due to its complexity, the equipment needed to operate a SONET network is extremely expensive. SONET networks power some of the world's networks (telephone and Internet). For that reason, SONET is designed to run at 99.999% uptime. This is also known as "the 5 nines" of availability.

One of SONET's interesting characteristics is its support for a ring topology. Normally, one piece of fiber or "working ring" handles all data traffic, but a second piece of fiber or the "protection ring" remains on standby. Should the working ring fail, SONET includes the capability to automatically detect the failure and transfer control to the protection ring in a very short period of time. For this reason, SONET can be described as a self-healing network technology.

Many of the functions of a SONET network and SONET rings operate at or with a physical layer or the layer of the fiber optic cabling. The Internet Protocol or IP protocol utilizes the concept of a ring such as a token ring, but the IP rings operate at a much higher layer in the open systems interconnect (OSI) model.

Given the present state of the art, a need arises for a resilient IP ring protocol and architecture.

DETAILED DESCRIPTION

Embodiments in accordance with the present disclosure provide a resilient IP ring protocol and architecture as well as a method to create an IP interface that spans across devices on an IP network. The architecture provides a similar topology to SONET including link/node failure detection, wrapping capabilities and traffic-engineering, but on an higher level for IP protocols. The techniques and architectures described herein can be used to simply deploy replicated content such as in IPTV Multicast. A resilient IP ring (RIPR) protocol as described herein can be a routing protocol for updating router routing tables, or a signaling protocol for signaling between routers in an IP network, or an encapsulation protocol similar to IP/GRE encapsulation for transport.

In a first embodiment of the present disclosure, a resilient internet protocol (IP) ring architecture can include a first IP device serving as a ring node, a second IP device serving as a ring node where the first IP device and the second IP device serve as endpoints and form a ring between said endpoints, and at least one IP device serving as an intermediary node between said endpoints. The architecture can support a network mode and an independent mode. In other words, the architecture supports the intermediary node within a network or independent of the network. The resilient IP ring architecture can use sub-second level signaling between adjacent ring nodes to determine when adjacent ring nodes have failed. The architecture further supports a routing protocol to update a routing information base (RIB) of intermediate routers when requested and an encapsulation tool similar to a generic route encapsulation (GRE) style of encapsulation tool with little overhead.

During a network mode, the intermediate nodes can modify their information for a routing information base according to signaling information from the resilient IP ring protocol. In other words, routers in a network will participate in RIRP signaling to update routing tables to accommodate RIRP services. For an independent mode, the intermediate nodes can remain independent of the resilient IP ring protocol except for forwarding of standard IP traffic. Note, each ring node in the resilient IP ring architecture can be identified by an IP address and a system name. In the independent mode, the underlying IP network does not need to participate in RIRP signaling. The network independent mode can be deployed across the Internet or in a network where it is not desirable to deploy the RIRP features on a "core" network, but possibly on the edges of the network.

The resilient IP ring architecture can include one or more failure options of redirecting traffic via a bi-directional ring towards an originating ring node, redirection of traffic to a backup-ring at a ring node that discovers an adjacent ring-node failure, or a ring-reroute option that rebuilds the ring to a next ring-node listed when a ring-node has discovered that an adjacent ring-node failure. The ring-reroute option can use preference weights and priorities to determine a next ring-node to rebuild to. With respect to IP encapsulation of multiple sources, the resilient IP ring can specify a series of IP interfaces to originate IP packets when encapsulating data to an adjacent ring-node for IP encapsulation of multiple sources.

In a second embodiment of the present disclosure, a communication device using a resilient internet protocol (IP) ring protocol can include a controller that manages operations of a transceiver for exchanging messages in a communication system with adjacent ring nodes in a communication ring architecture. The controller can be programmed to use sub-second level signaling between adjacent ring nodes to determine when adjacent ring nodes have failed and enable failure options upon detection of an adjacent ring-node failure. The controller can incorporate one or more of the failure options which can include a redirecting of traffic via a bi-directional ring towards an originating ring node, or a redirection of traffic to a backup-ring at a ring node that discovers an adjacent ring-node failure, or a ring-reroute option that rebuilds the ring to a next ring-node listed (in a router table) when a ring-node has discovered an adjacent ring-node failure.

In a network supporting architecture, RIRP control messages are sent out to IP interfaces to routers via a Multicast address. These routers will form an adjacency and transmit signalling information. The adjacencies can be to routers that are only functioning to support RIRP, but not actively involved in de-encapsulating the RIRP traffic. Each active participant in RIRP can define all other participants in the RIRP ring. IP multicast can be utilized to "discover" other participants in an RIRP ring. Establishing an RIRP communications in a network supporting mode can involve a Ring-Node transmitting RIRP hello messages to adjacent devices to for a RIRP adjacency. These hello packets are transmitted to a Multicast address and can define a Ring-ID, MD5 authentication and router-id's. Once the adjacency is formed, RIRP control messages can be transmitted. The adjacency can be configured to use sub-second hello/dead timers to determine when a link failure has occurred.

The controller can be further programmed to support a routing protocol to update a routing information base (RIB) of intermediate routers when requested or alternatively or optionally programmed to support an encapsulation tool similar to a generic route encapsulation (GRE) style of encapsulation tool with little overhead. The controller can also modify information for a routing information base (RIB) when serving as an intermediary node according to signaling information from the resilient IP ring protocol during a network mode. The controller can further programmed to remain independent of the resilient IP ring protocol when serving as an intermediary node except for forwarding of standard IP traffic or operate the communication device as a network node in a network mode.

Establishing RIRP communication in a network non-supporting mode, a Ring-Node can transmit RIRP hello messages to a router elsewhere in the network according to the design of the ring (a pre-defined list of devices in a ring). These packets are transmitted directly via Unicast to the Ring-Node with a specific port defined for establishing adjacencies and control messages. These hello messages will use Ring-ID, MD5 authentication as well as router-ids in their messages. Once the adjacency is formed, control messages can be processed. Sub-second hello/dead timers can be configured across this adjacency to determine link-failure. Additional configurations can allow for the examining of IP TTL values as well as RTT (latency) to determine when a path is "too long".

In a third embodiment of the present disclosure, a computer-readable storage medium operating in a communication device can include computer instructions for exchanging messages in a communication system with adjacent ring nodes in a communication IP ring architecture, sub-second level signaling between adjacent ring nodes to determine when adjacent ring nodes have failed, and enabling failure options upon detection of an adjacent ring node failure. The storage medium can further include other computer instructions for operating or functioning as described in the previous embodiments above.

In a fourth embodiment of the present disclosure, a resilient internet protocol (IP) ring architecture can have a first IP device serving as a ring node, a second IP device serving as a ring node, wherein the first IP device and the second IP device serve as endpoints and form a ring between said endpoints, and at least one IP device serving as an intermediary node between endpoints, wherein each ring node in the resilient IP ring architecture is identified by an IP address and a system name and wherein the resilient IP ring architecture uses sub-second level signaling between adjacent ring nodes to determine when adjacent ring nodes have failed, and failure options upon determining failure of an adjacent ring node of redirecting traffic via a bi-directional ring towards an originating ring node, redirection of traffic to a backup-ring at a ring node that discovers an adjacent ring-node failure, and a ring-reroute option that rebuilds the ring to a next ring-node listed when a ring-node has discovered that an adjacent ring-node failure.

Figure 1:
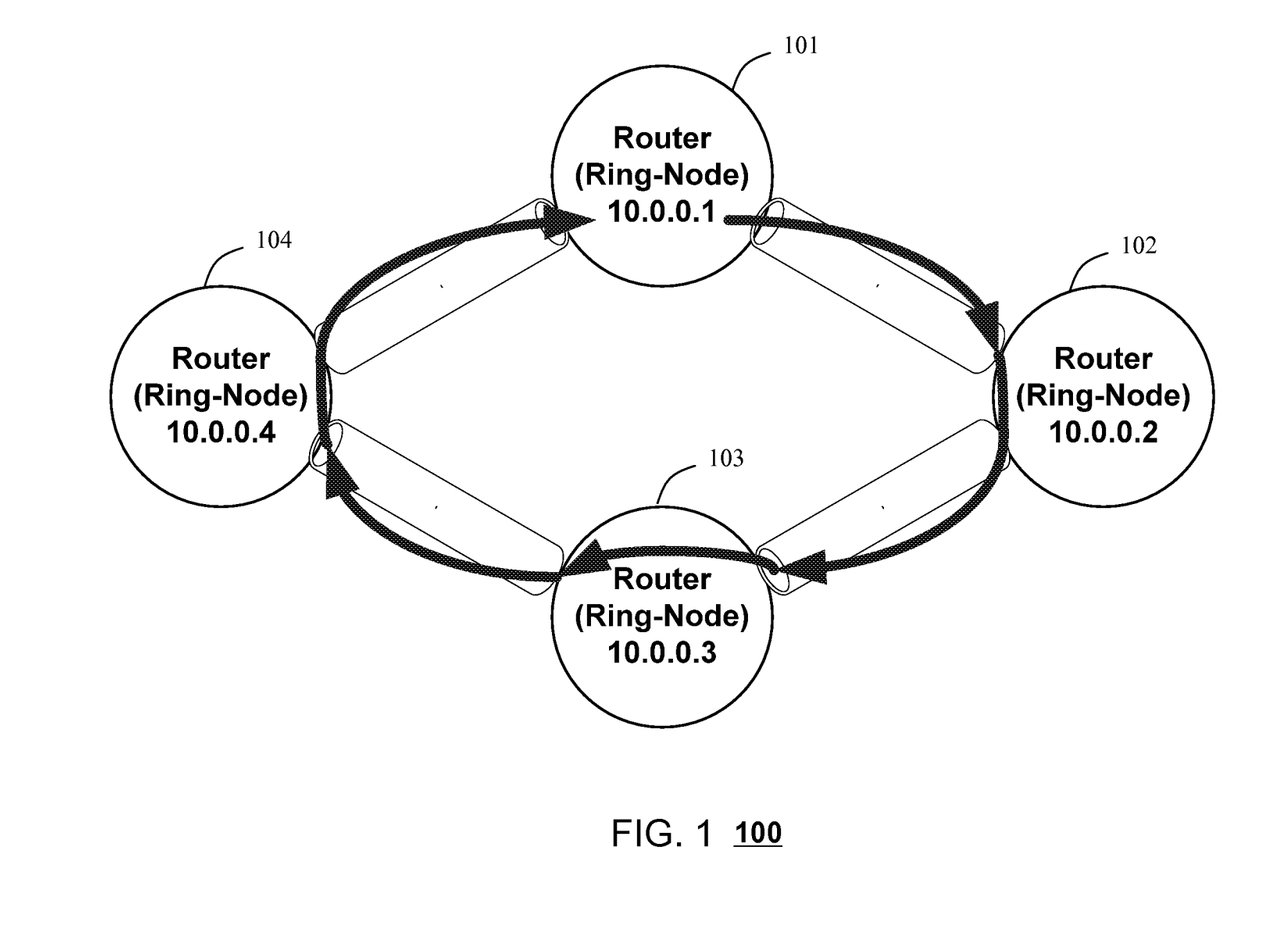
FIG. 1 depicts an exemplary embodiment of a basic ring design and traffic flow in a network supporting mode using a resilient IP ring protocol (RIRP) and architecture.
Figure 2:
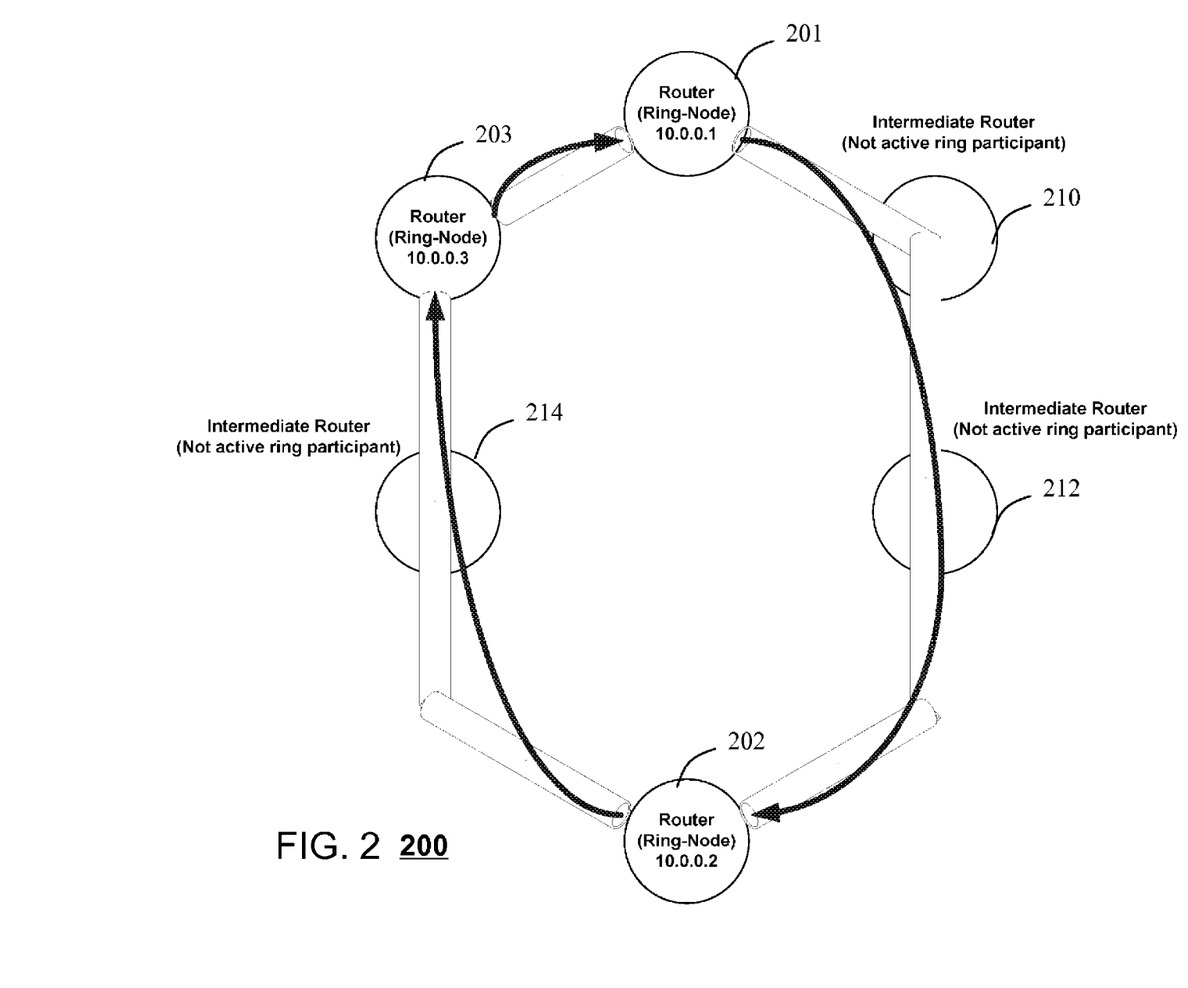
FIG. 2 depicts an exemplary embodiment of a basic ring design and traffic flow in a non-network supporting mode using an IP ring protocol and architecture.

Referring to FIG. 1, a basic ring design 100 and traffic flow (in a network supporting mode) is shown using a Resilient IP Ring Protocol (RIRP) in accordance with the disclosure herein. RIRP allows for IP capable devices to form a "ring" between end points. In this instance, the router ring nodes include addresses 10.0.0.1 for ring-node 101, 10.0.0.2 for ring-node 102, 10.0.0.3 for ring-node 103, and 10.0.0.4 for ring-node 104. This ring can be configured with support of intermediate nodes in the network cloud or independent of the network. The RIRP can operate in two modes (Network supporting or network independent) with a specific architecture and functionality including Ring ID, Ring-Direction, Bi-Directional Ring, Ring-Node, Intermediate router, Ring termination, Ring-Loop, Ring-Rebuild, Ring-Preference-Weight, Backup-rings, main-ring, sub-ring, and sub-ring bridge, and sub-ring interconnection (all further defined below). A basic ring design 200 and traffic flow (in a non-network supporting mode) is shown in FIG. 2 using and an RIRP including ring nodes 201, 202, and 203 as well as intermediate routers 210, 212, and 214 that are not active ring participants.

RIRP signaling can have different datagram types. RIRP can be a User Datagram Protocol/Internet Protocol (UDP/IP) datagram. UDP is a protocol within the TCP/IP protocol suite that is used in place of TCP when a reliable delivery is not required. There is less processing of UDP packets than there is for TCP. UDP is widely used for streaming audio and video, voice over IP (VoIP) and videoconferencing, because there is no time to retransmit erroneous or dropped packets. If UDP is used and a reliable delivery is required, packet sequence checking and error notification must be written into the applications. UDP is "connectionless" and does not use a handshake to start a session. It just sends out packets. In the case of RIRP, there are generally two different types of messages, namely Adjacency type and Control type messages. Adjacency type messages are used for forming point-to-point adjacencies or point-to-multipoint (or broadcast media) adjacencies. Adjacency type messages can also include Hello or Dead keep-alive signals. Control type messages are used in transmitting various control messages that can have for example topology information, re-routing information, or diagnostic information.

More specifically, Adjacency type messages can include INITIATE messages that are datagrams specifying local router-ids, ring-ids, MD5 authentication hash/keyes. Adjacency message can also include HELLO (Keep-Alive) messages that are sent at a specific interval. A remote end can have a pre-determined dead-timer in which it will declare an adjacency as dead if no hello is received. With respect to Control type messages, they can specifically include Topology messages that are update messages detailing to adjacent nodes their view of the ring, hop by hop. When a Ring-Node sees its own Node-ID/Router-ID in a ring, it can halt the ring update accordingly and interpret this as the end of the ring. Another Control type message Reroute messages that enable a dynamic method to notify a downstream device to reroute around a downstream failure, stating what the next adjacency should be built to.

RIRP brings a level of resiliency that is already well familiar in the telecom network with SONET (optical) networks and builds upon the fundamentals of SONET rings to enable IP networks to operate with similar principals and redundancy. RIRP captures both the simplicity of SONET networks and the resiliency of IP networks to form a ring. The RIRP can include a routing protocol to update the routing information base (RIB) of intermediate routers if requested, a signaling protocol to signal other routers in the ring, and an encapsulation protocol similar to generic route encapsulation (GRE) style of encapsulation with little overhead. This ring can be configured with support of intermediate nodes in the network cloud or independent of the network (depending on the features required of the operator). RIRP further allows for an efficient and flexible method to create a ring within an IP network to deliver data in a method currently not supported today.

RIPR signaling protocols operate at the sub-second level to maintain a heartbeat between Ring-Nodes. Circuit level notifications or alarms available in SONET would be unreliable and thus RIRP signaling utilizes sub-second hellos and dead timers to determine if an adjacent Ring-Node has failed.

Traffic that would transit over a RIRP enabled service/network can typically be broadcast or multicast content, but is not necessarily limited thereto. Specifically distributed content (patches, VOD assets), video or audio content where latency to a destination is not of particular concern can operate suitably with RIRP. RIRP further improves upon existing IP multicast operation in terms of reliability since current multicast techniques are still far from reaching sub-second levels of redundancy that SONET offers today. Although SONET brings a level of resiliency that is well known in the telecommunications networks industry, such level of resiliency have yet to be applied at a higher operating level such an IP layer. Building upon the fundamentals of SONET rings, RIRP enables IP networks to operate with similar principals and redundancy without sacrificing the inherent benefits of IP protocols and ring architectures. RIRP captures the best of SONET networks and IP networks to form a ring.

RIRP can be considered a routing protocol to update the RIB of intermediate routers if requested, or a signaling protocol to signal other routers in the ring, or an encapsulation protocol similar to a GRE style of encapsulation with little overhead. The RIRP protocol can have many different features that can be further understood in the context of the following definitions:

Ring-ID: A unique ID number or identifier assigned to a ring. Ring-Direction: The direction to transmit traffic in a ring. By default, a ring will transmit to the right. A pre-defined direction of traffic to egress a node to the next Ring-Node. Bi-Directional Ring: A ring operating in both directions. Each ring has its own separate set of IP addresses. The primary goal for the bi-directional ring feature is that in event of a failure of a primary ring, nodes can transmit via the other ring. In this regards, the ring can be thought of as being divided into two segments. One for traffic destined to the left while another destined to the right. Separate IP addresses are required for each segment. Ring-Node: A router participating or being an active participant in a ring. Intermediate router: A router in the middle of the ring that may or may not have ring awareness. It is not a Ring-Node.

Ring-Termination: A Ring-Node that no longer forwards data to an adjacent Ring-Node because that Ring-Node was the source of the data or a Ring-Node that no longer forwards traffic due to a failure. Ring-Loop: A loop can be formed in a situation where a failure has occurred. If a Ring-Node sees a failure to the adjacent Ring-Node, it will notify all other Ring-Node members of the cut and begin forwarding traffic backwards across the Ring to the originating Ring-Node with data marked as having been turned back due to a failure. The originating Ring-Node will then proceed to forward the traffic to its destination via the opposite path. Ring-Rebuild: A rebuild function is when a Ring-Node discovers loss of connectivity to its adjacent Ring-Node. It will then attempt to re-establish the Ring by forming an adjacency with the next Ring-Node in line. Other configuration options exist to define preferences when rebuilding the Ring.

Ring-Preference-Weight: Ring-Nodes can be specified with a Preference-Weight to define a Ring-Nodes status in a Ring. This is done to assist a Ring-Rebuild to determine which Ring-Nodes adjacent to the failed Ring-Node should be selected. This allows for the Ring-Rebuild to bypass an undesired Ring-Node and re-establish the Ring at a higher tier. Backup-Rings: A Backup-Ring is a Ring with its own list of Ring-Node participants. This backup Ring can be used when a failure has occurred on the Main-Ring. An operator can choose several Backup-Rings based upon a certain set of traffic-engineering requirements. Main-Ring: The highest level of a ring in a two-ring hierarchy. Sub-Ring: A ring that hangs as a leaf off its Main-Ring. The role of a Sub-Ring is to replicate the Main-Ring data downstream to users of the Sub-Ring. Sub-Ring Bridge: A router designated to bridge two sub-rings together for the purpose of efficient routing of data destined for an adjacent Sub-Ring only. Also to provide redundancy in the event one ring is isolated from the Main-Ring. Sub-Ring Interconnection: The connection of two sub-rings to each other for redundancy purposes. This connection must transit a Sub-Ring Bridge.

A discussed above RIRP can operate in two basic modes, namely a Network supporting mode and a network independent mode. The network supporting mode can require RIRP participation of some degree from intermediate routers inside a network cloud. This can require that intermediate nodes need to participate in modifying their RIB according to signaling information from RIRP. This allows flexibility for an operator to better control the flow of traffic through the network. The network independent mode enables intermediate routers to avoid being involved in RIRP other than forwarding standard IP traffic.

RIRP signaling can provide multicast signaling and unicast signaling. Multicast can be utilized to transmit signaling information to assist in the establishing of a ring. In addition, multicast can be used for ring setup/failure notifications. Multicast can be used to advertise a Ring-Node's desire to join a ring for example. Once information was seen by the parties involved, individual unicast signaling sessions can be established. The purpose of using Multicast is that Ring-Nodes only need to know two neighbors to establish a session. The use of multicast also ensures that all parties will transmit broadcast signaling to the multicast address rather than to individual neighbors. A multicast address will have to be allocated for specific use of RIRP. With Unicast, RIRP Ring-Nodes can specifically define neighbors to form adjacencies. A Ring-Node needs at a minimum of one adjacent Ring-Node to function in a redundancy/loss scenario. In order to establish a Ring-Node, it can form unicast sessions with its adjacent two Ring-Nodes. All RIRP signaling requires unicast signaling at some point in order to transmit messages to adjacent Ring-Nodes.

RIRP forwarding can involve encapsulation under different protocols. For example, encapsulation under IP or under multiprotocol label switching protocol (MPLS). Encapsulated under IP involves encapsulating traffic to be encapsulated over an IP network. The RIRP encapsulation involved would be very minimal. Specific parts of the header would include information such as Ring-ID and direction. With encapsulated under MPLS, the RIRP can encapsulate its traffic with its own header to be encapsulated under MPLS. The purpose of this would be to leverage existing MPLS label switch paths (LSPs) between Ring-Nodes. Operators could then put constraints on the MPLS LSP between Ring-Nodes (TE, Fast ReRoute).

Forwarding can be provided by either IP or MPLS. Such decisions are made by the operator when configuring the protocol. This requires that the Ring-Nodes have the capability to do the function requested (i.e. MPLS must be supported and signalled between two Ring-Nodes). IP forwarding relies on a GRE/IP like type of encapsulation. The Source and Destination address are numbered according to the Ring-Nodes IP addresses (such as a Loopback interface). Inside the IP packet, there is a RIRP-ENCAP datagram containing the payload of the data to be transmitted via the ring. Inside a MPLS label would be a RIRP-ENCAP datagram containing the payload of the data to be transmitted via the ring. Additional load balancing features allows for the IP packets containing the RIRP encapsulation to be have the source & destination address to be variable. This would leverage many IP routers load balancing hashing techniques. The RIRP-ENCAP header/datagram can contain basic identifiers to assist Ring-Nodes in determining how to forward the payload. These include: Ring-ID (The Ring-ID # this data is meant for), Source Ring-Node (The router-id/ring-node IP address of the ring-node originating the source), Destination Ring-Node (The router-id/ring-node IP address of the destination of the payload), or Priority (A value defining the priority of the payload, for QoS and other preferential treatment).

Hello mechanisms between RIRP capable devices determine link-failure as well as node failure. In the event that an adjacent RIRP node has failed, several actions can occur. For example, a control message can be transmitted in the opposite direction of the failure notifying all nodes, or any traffic destined to the failure can be routed backwards to point of origin. This is a temporary "loop" measure. Any node seeing backwards routing will interpret this as a failure and transmit traffic in the other direction. The point of failure can attempt to build a RIRP adjacency around the failure. This can be done via looking at the topology update and attempting to establish to the hop before the failure. The traffic "loop" is a temporary measure while the RIRP adjacencies are built around the failure.

Figure 3:
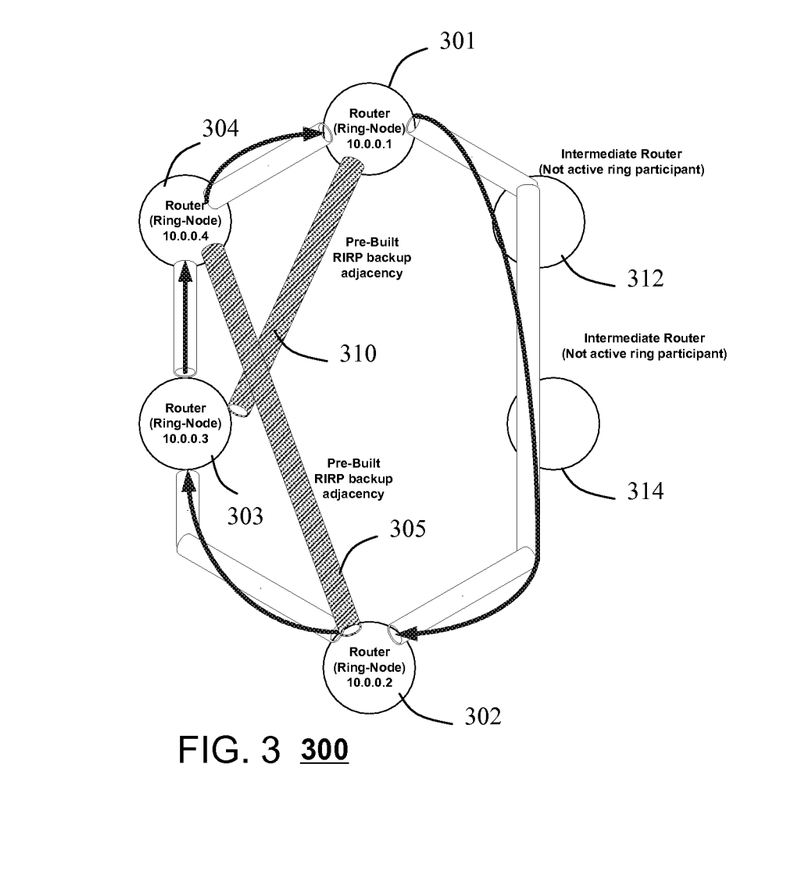
FIG. 3 depicts an exemplary embodiment of an RIRP ring architecture using pre-built RIRP adjacencies before a traffic failure occurs.
Figure 4:
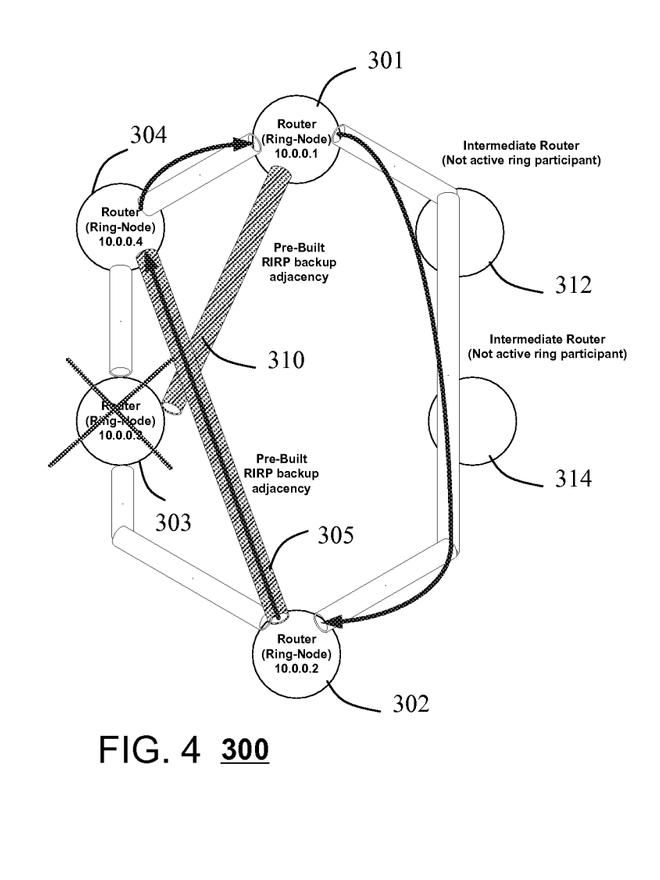
FIG. 4 depicts the architecture of FIG. 3 after a traffic failure occurs.
Figure 5:
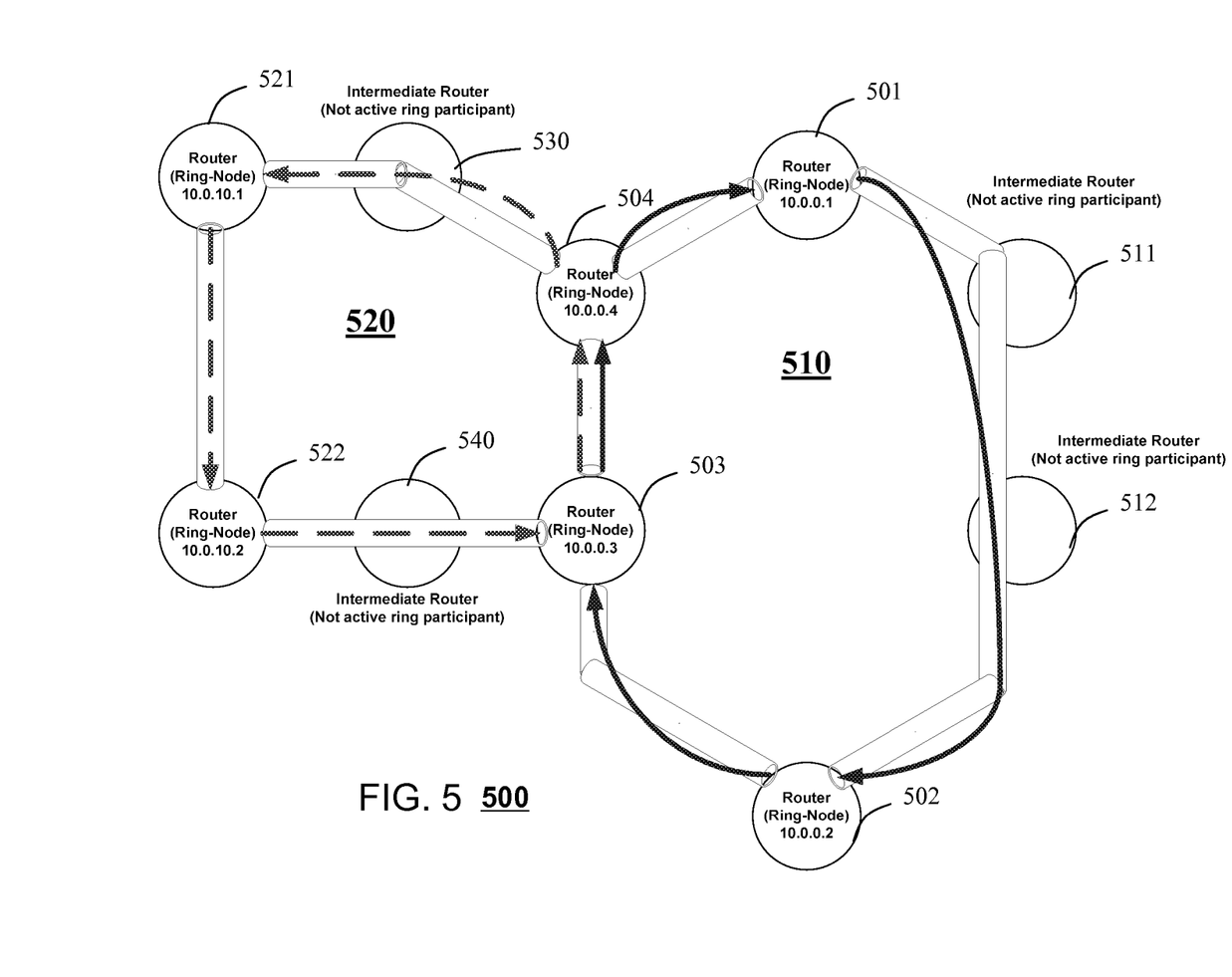
FIG. 5 depicts a ring and sub-ring architecture and traffic flow using the RIRP protocol.

Referring to FIGS. 3 and 4, a RIRP ring architecture 300 can include pre-built adjacencies to provide additional protection measures that can be enabled by allowing a next-next-hop (NNH) RIRP sessions to be formed and kept in a backup mode. This can enable for rapid convergence to a bypass route around a failure and not require that an additional RIRP adjacency be formed in the event of a failure. As illustrated in FIG. 3, the ring architecture 300 includes router ring nodes 301, 302, 303, and 304 as well as intermediate routers 312 and 314 which are inactive ring participants. The architecture 300 further includes pre-built RIRP backup adjacencies 305 and 310 that can be formed and kept in backup before a failure occurs and obviously during a failure. The ring node 303 in FIG. 4 is shown as failed and the traffic flow conveniently uses the pre-built RIRP backup adjacency 305 to route traffic from ring-node 302 to ring-node 304 and bypassing the failed ring-node 303.

When a ring forms an adjacency/session with a its left or right Ring-Nodes, several key pieces of information are received and transmitted. A Ring-Node will learn the entire path via right and left of all Ring-Nodes. Each Ring-Node can be identified by IP address and a system name. This is in order to determine when a break has occurred in the Ring and if a Ring-Node would need to know if it must terminate the traffic.

With respect to path selection in a network supported architecture, RIRP can communicate with all intermediate routers to determine routing between two Ring-Nodes. RIRP can communicate with all routers between Ring-Nodes to determine a path based upon requirements. This function is not possible in a network independent architecture, where the networks interior gateway protocol (IGP) or MPLS topology determines the path of the Rings.

The RIRP Failure options can utilize a loop where a redirection of traffic via a bi-directional ring towards the originating Ring-Node provides one option. Another option involves diverting to a Backup-Ring where a redirection of traffic to a Backup-Ring at a Ring-Node is done upon discovering an adjacent Ring-Node failure. In yet another failure option, a Ring Reroute occurs when a Ring-Node that has discovered an adjacent Ring-Node failure rebuilds the Ring to the next Ring-Node listed. Various Preference-Weights and priorities can be utilized to determine the next Ring-Node.

Additional RIRP options can include IP Encapsulation Multi-Source where a series of IP interfaces to originate IP packets from when encapsulating data to an adjacent Ring-Node are specified. This allows for RIRP traffic to leverage load-balancing capabilities in the IP backbone network that would not otherwise be used with simple generic routing encapsulation (GRE) tunneling. This addresses the idea of using GRE tunnels to form a ring, yet the IP Backbone load balancing hashing algorithm does not load balance the traffic because the source and destination are static.

Ring-List Database Example:
  Router ID: 1.0.0.1
  Left Database: 1.0.0.2, 1.0.0.3, 1.0.0.4, 1.0.0.5
  Right Database: 1.0.0.5, 1.0.0.4, 1.0.0.3, 1.0.0.2
  In the above example, 1.0.0.2 would not transmit any more packets into the ring for packets originated from Ring-Node 1.0.1. This is assuming multicast or broadcast type traffic. Point-to-Point traffic (from one Ring-Node to another Ring-Node), traffic would terminate at the Ring-Node where the traffic is destined for. It would not be forwarded any further.

Figure 6:
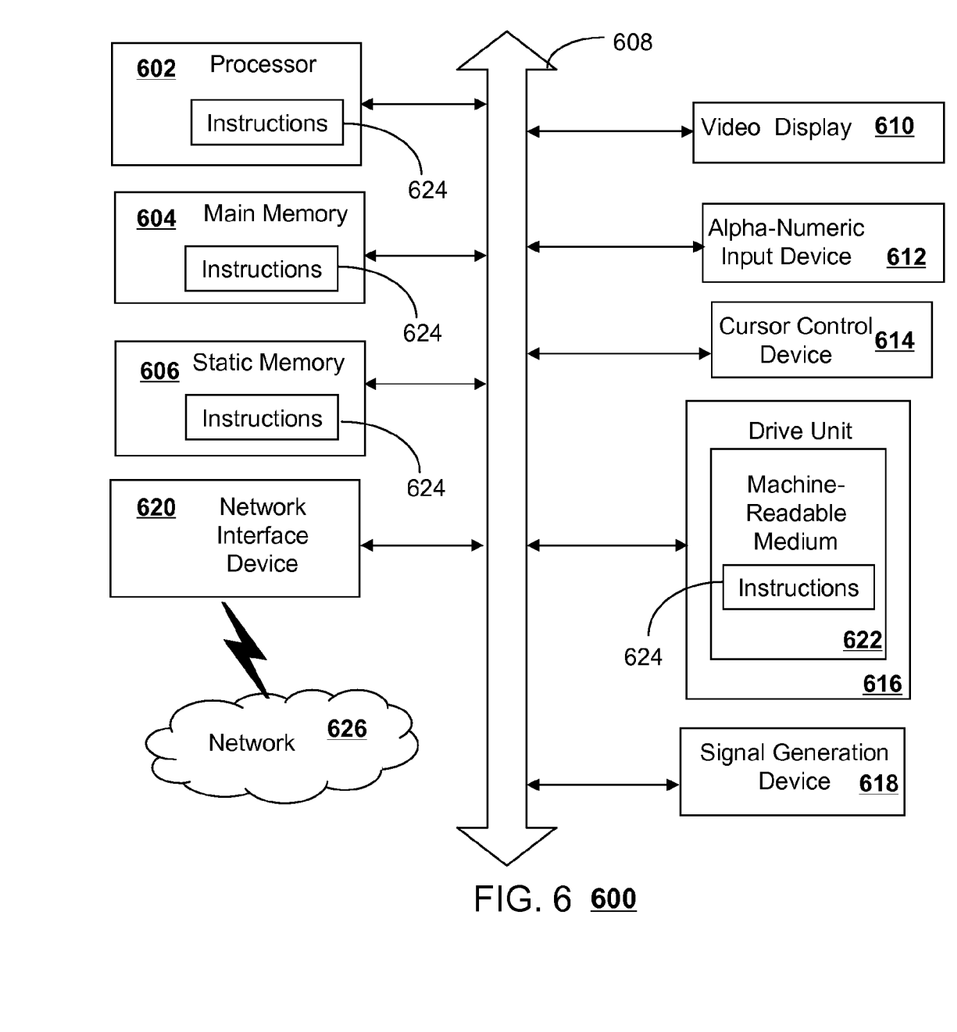
FIG. 6 depicts an exemplary diagrammatic representation of a machine in the form of a computer system within which a set of instructions, when executed, may cause the machine to perform any one or more of the methodologies disclosed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" or "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A router, operating as a first ring node of a plurality of ring nodes in a communications ring, comprising:
 a memory to store instructions, a plurality of internet protocol addresses identifying the plurality of ring nodes in the communications ring, and a pre-built backup adjacency; and
 a controller coupled to the memory, wherein the controller, responsive to executing the instructions, performs operations comprising:
  transmitting a first ring message to a second ring node of the plurality of rings nodes in the communication ring, wherein the second ring node is adjacent to the router and wherein the router is an intermediate ring node between endpoints of the communication ring;
  detecting failure of the second ring node, wherein, responsive to detecting the failure, the router performs resilient internet protocol ring protocol failure options selected from a group comprising redirecting traffic via a bi-directional ring towards an originating ring node, redirecting the traffic to a backup-ring, and rebuilding the communication ring to a listed next ring node;
  selecting a third ring node of the plurality of ring nodes in the communication ring according to the failure that is detected, wherein the third ring node is selected based on the pre-built backup adjacency;
  establishing an adjacency relationship with the third ring node;
  transmitting a second ring message to the third ring node;
  modifying a routing information base associated with the communication ring according to signaling information from the resilient internet protocol ring protocol to reflect the adjacency relationship that is established when the router is operating in a network mode; and
  forwarding standard internet protocol traffic, without modifying the routing information base, when the router is not in the network mode.

2. The router of claim 1, wherein the pre-built adjacency is based on one of a preference weight or a priority assigned to each ring node of the plurality of ring nodes of the communication ring.

3. The router of claim 1, wherein the controller, responsive to executing the instructions, performs operations comprising transmitting a unicast message to the second ring node, wherein the unicast message uses sub-second hello timers for signaling between the first and second ring nodes.

4. The router of claim 1, wherein the controller, responsive to executing the instructions, performs operations comprising updating a routing information base associated with the communication ring responsive to receiving a request to updated the routing information base.

5. A communication device, comprising:
 a memory to store instructions, a plurality of internet protocol addresses identifying a plurality of ring nodes in a communications ring, and a pre-built backup adjacency; and
 a processor coupled to the memory, wherein the processor, responsive to executing the instructions, performs operations comprising:
  exchanging first messages in a bi-directional communication ring;
  transmitting a unicast hello message to a first ring node of the bi-directional communication ring, wherein the first ring node is adjacent to the communication device and wherein the communication device is an intermediate ring node between endpoints of the bi-directional communication ring;
  detecting a failure of the first ring node by monitoring a response to the unicast hello message, wherein, responsive to detecting the failure, the communication device performs resilient internet protocol ring protocol failure options selected from a group comprising redirecting traffic via a second bi-directional ring towards an originating ring node, redirecting the traffic to a backup-ring, and rebuilding the bi-directional communication ring to a listed next ring node;
  selecting a second ring node of the bi-directional communication ring according to the failure that is detected, wherein the second ring node is selected based on the pre-built backup adjacency;
  reassigning an adjacency relationship associated with the communication device from the first ring node to the second ring node;
  modifying a routing information base associated with the bi-directional communication ring according to signaling information from the resilient internet protocol ring protocol to reflect the adjacency relationship that is reassigned when the communication device is operating in a network mode;
  forwarding standard internet protocol traffic, without modifying the routing information base, when the communication device is not in the network mode; and
  exchanging second messages in the bi-directional communication ring according to the adjacency relationship.

6. The communication device of claim 5, wherein the pre-built backup adjacency is based on one of a preference weight or a priority assigned to each ring node of a plurality of ring nodes of the bi-directional communication ring.

7. A non-transitory computer-readable storage medium comprising instructions which, responsive to being executed by a processor, cause the processor to perform operations comprising:
 transmitting a first ring message to a second ring node of a communications ring;
 detecting at a first ring node of the communication ring a failure of the second ring node of the communication ring, wherein the second ring node is adjacent to the first ring node, wherein the first ring node is an intermediate ring node between endpoints of the communication ring, and wherein, responsive to detecting the failure, further performing resilient internet protocol ring protocol failure options selected from a group comprising redirecting traffic via a bi-directional ring towards an originating ring node, redirecting the traffic to a backup-ring, and rebuilding the communication ring to a listed next ring node;
 selecting a third ring node of the communication ring according to the failure that is detected, wherein the third ring node is selected based on a pre-built backup adjacency stored at the first ring node;
 establishing an adjacency relationship between the first ring node and the third ring node; and
 transmitting a second ring message through the third ring node according to the adjacency relationship;
 modifying a routing information base associated with the communication ring according to signaling information from the resilient internet protocol ring protocol to reflect the adjacency relationship that is established when the first ring node is operating in a network mode; and forwarding standard internet protocol traffic, without modifying the routing information base, when the first ring node is not in the network mode.

8. The non-transitory computer-readable storage medium of claim 7, wherein the pre-built adjacency is based on one of a preference weight or a priority assigned to each ring node of a plurality of ring nodes of the communication ring.

9. A method, comprising:

exchanging, by a first ring node of a bi-directional communication ring, messages in the bi-directional communication ring, wherein the first ring node comprises a processor and wherein the first ring node is an intermediate ring node between endpoints of the bi-directional communication ring;

transmitting, by the first ring node, a unicast hello message to a second ring node of the bi-directional communication ring;

detecting, by the first ring node, a failure of the second ring node by monitoring a response to the unicast hello message, wherein the second ring node is adjacent to the first ring node, wherein, responsive to detecting the failure, the first ring node performs resilient internet protocol ring protocol failure options selected from a group comprising redirecting traffic via a second bi-directional ring towards an originating ring node, redirecting the traffic to a backup-ring, and rebuilding the bi-directional communication ring to a listed next ring node;

selecting, by the first ring node, a third ring node of the bi-directional communication ring according to the failure that is detected, wherein the third ring node is selected based on a pre-built backup adjacency stored at the first ring node;

reassigning, by the first ring node, an adjacent relationship associated with the first ring node from the second ring node to the third ring node;

transmitting, by the first ring node, second messages in the bi-directional communication ring according to the adjacency relationship;

modifying a routing information base associated with the bi-directional communication ring according to signaling information from the resilient internet protocol ring protocol to reflect the adjacency relationship that is established when the first ring node is operating in a network mode; and forwarding standard internet protocol traffic, without modifying the routing information base, when the first ring node is not in the network mode.

10. The router of claim 1, wherein the controller, responsive to executing the instructions, performs operations comprising performing generic route encapsulation.

11. The router of claim 1, where the controller, responsive to executing the instructions, performs operations comprising:

encapsulating data for internet protocol encapsulation of multiple sources; and specifying a series of internet protocol interfaces to originate internet protocol packets.

12. The communication device of claim 5, wherein the processor, responsive to executing the instructions, performs operations comprising performing generic route encapsulation.

13. The communication device of claim 5, where the processor, responsive to executing the instructions, performs operations comprising:

encapsulating data for internet protocol encapsulation of multiple source; and specifying a series of internet protocol interfaces to originate internet protocol packets.

14. The non-transitory computer-readable storage medium of claim 7, comprising instructions which, when executed by the processor, cause the processor to perform operations comprising performing generic route encapsulation.

* * * * *